United States Patent [19]
Lilienstein

[11] 3,801,907
[45] Apr. 2, 1974

[54] DIRECT CURRENT MEASUREMENT

[76] Inventor: Manfred Lilienstein, 5276 Willow Wood Rd., Rolling Hills Estates, Calif. 90274

[22] Filed: Oct. 12, 1972

[21] Appl. No.: 296,878

[52] U.S. Cl................... 324/117 R, 324/127, 330/8
[51] Int. Cl.......................... G01r 33/00, G01r 1/22
[58] Field of Search............. 324/117 R, 127; 330/8

[56] References Cited
UNITED STATES PATENTS
2,164,383  7/1939  Burton................................... 330/8
3,015,073  12/1961  Mamon................................. 330/8

Primary Examiner—Alfred E. Smith
Assistant Examiner—Ernest F. Karlsen
Attorney, Agent, or Firm—Robert R. Thornton

[57] ABSTRACT

A direct current measuring device utilizing two pairs of saturable toroidal reactors to generate two output signals which are compared to provide a feed back signal. The feed back signal is applied to the reactors through serially connected feed back windings to balance the output signals. The pairs of reactors have a bias signal applied through serially connected bias windings so that the bias signal applied to one pair is opposite in sense to the bias signal applied to the other pair. The magnitude of the feed back signal is measured to provide a direct indication of the current flow being measured.

8 Claims, 3 Drawing Figures

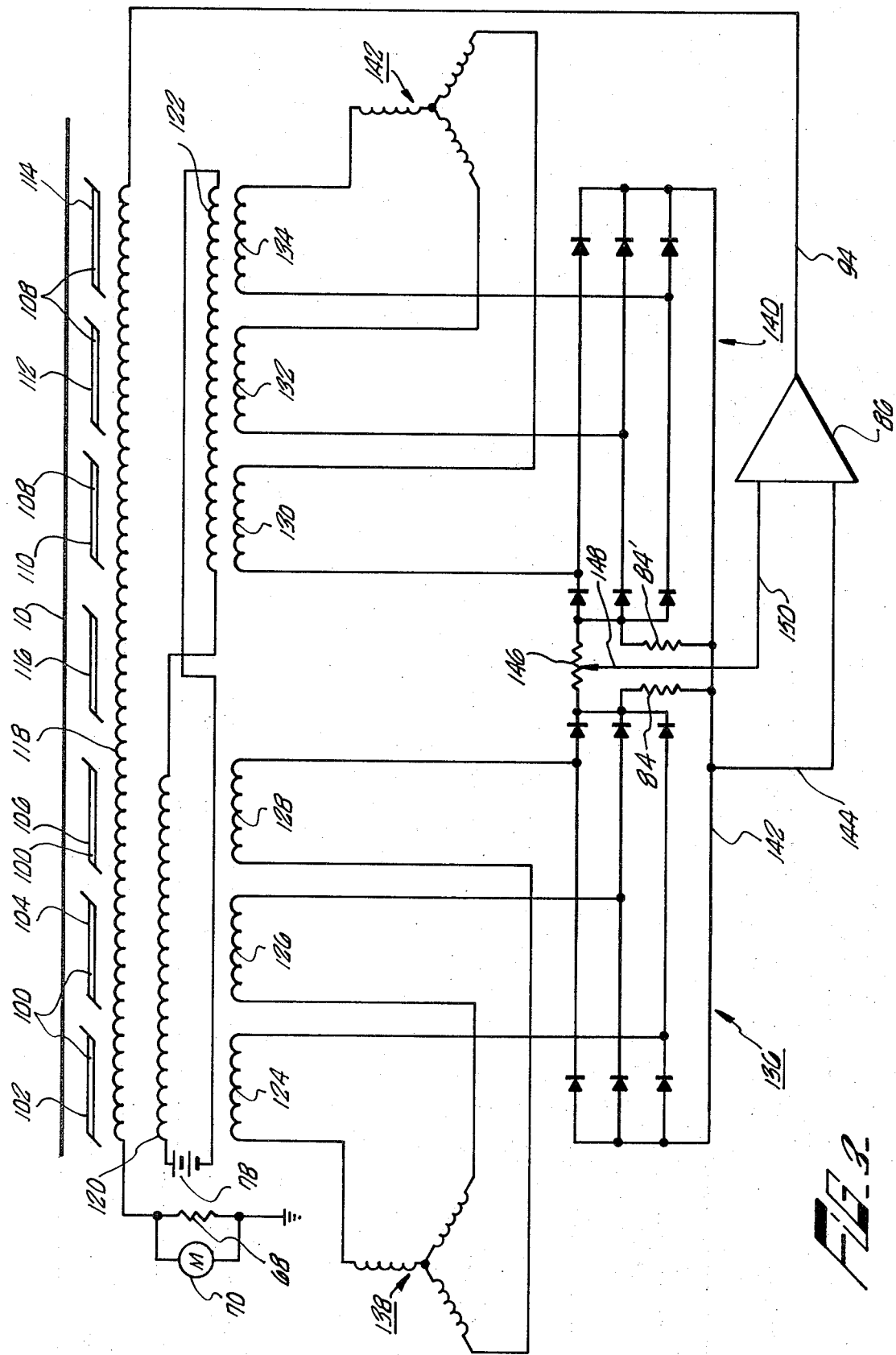

DIRECT CURRENT MEASUREMENT

BACKGROUND OF THE INVENTION

1. Field of the Invention

This invention relates to the indirect measurement of direct current through the utilization of saturable reactors.

2. Description of the Prior Art

Devices which may be utilized for the indirect measurement of direct current are well known in the art. one such device is described, for example, in U.S. Pat. No. 2,137,878 issued Nov. 22, 1938. In a modern version of the device described in the aforesaid patent, two saturable toroidal reactors are utilized. Whenever DC current flows in the conductor, the current flow which is to be measured, one of the reactors will become saturated, while the other remains unsaturated. The two reactors are alternately saturaged in accordance with the excitation voltage applied by the AC voltage source. The output current is not a function of the direction of current flow through the conductor. In addition, because of the magnetic characteristics of the reactors, the output current becomes increasingly nonlinear as the current flow through the conductor increases. Also, at the higher current operation the output is markedly affected by changes of the AC voltage source. Therefore, such a device, while quite useful for measuring in low current applications, has only limited usefulness in high current applications.

SUMMARY

According to the present invention, a device for measuring DC current flow in a conductor utilizes a first plurality of saturable reactors and a scond plurality of saturable reactors. The saturable reactors are preferrably toroidal in form. Each of the reactors has a control winding, a bias winding and a feed back winding thereon. A feed back circuit serially connects the feed back windings and a current flow indicator. The flow of current in the feed back windings is a function of the flow of current in the conductor being measured. A bias current circuit, including a source of DC biasing potential, serially connects the bias windings so that the bias windings of the first plurality of reactors are connected in magnetic opposition to the bias windings in the second plurality. A pair of output circuits are provided, one for the first plurality and one for the second plurality, and each produces a DC output signal. The DC output signals are applied to a differential amplifier, whose output drives the feed back windings. The current in the feed back circuit is measured to provide an indication of the current flow through the conductor. The current flow through the feed back windings opposes the magnetic effect of the current flow through the conductor, and so the apparatus according to the invention operates in the linear portion of the variation of induced voltage with current flow. By reason of the wide range of feed back current which may be applied, a much wider range of current flow in the conductor can be measured in the linear portion than was possible heretofore.

BRIEF DESCRIPTION OF THE DRAWING

The invention may be more readily understood by referring to the accompanying drawing in which

FIG. 3 is a schematic diagram of an alternate embodiment of the invention.

DESCRIPTION OF THE PREFERRED EMBODIMENTS

Figure 1:
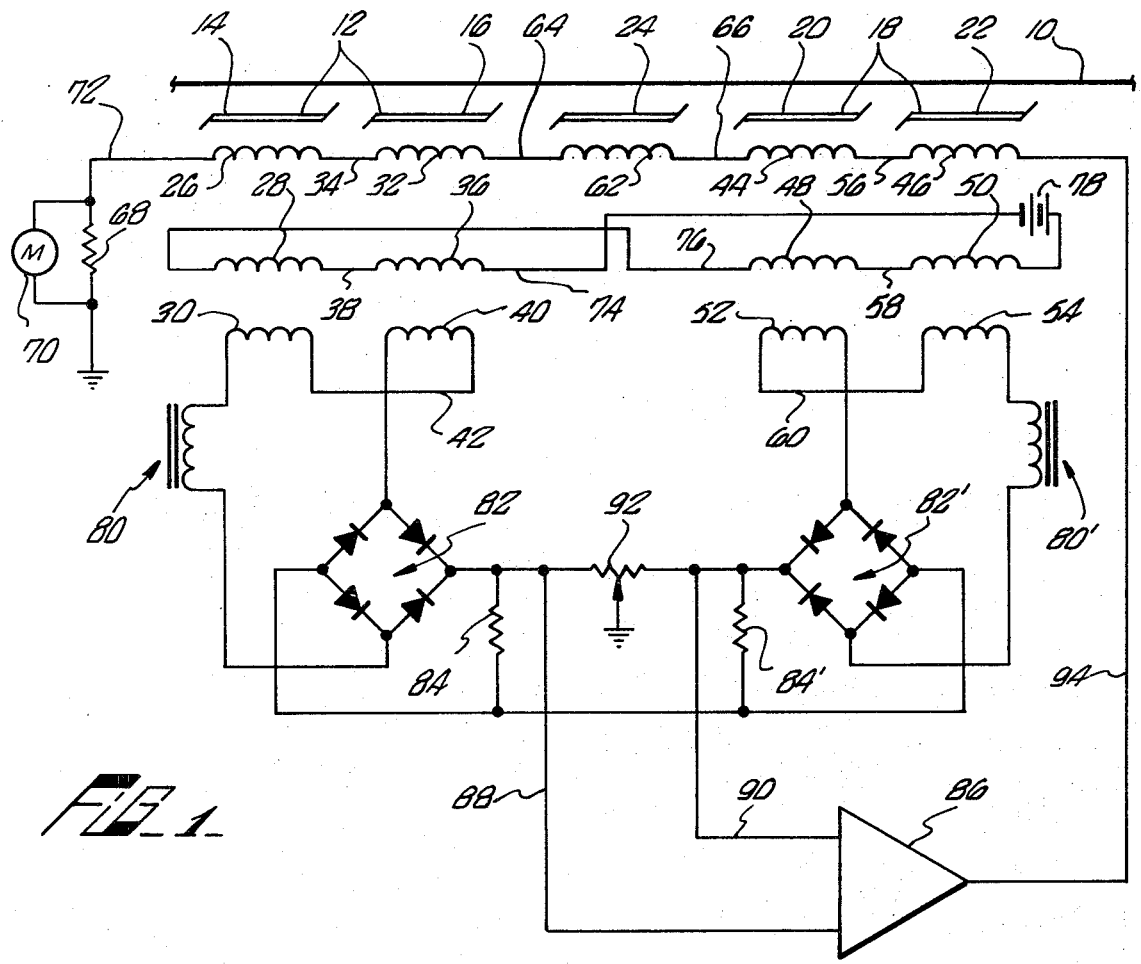
FIG. 1 is a schematic diagram of one embodiment of the invention.

Referring now to FIG. 1, there is shown a schematic diagram of the preferred embodiment of circuitry for direct current measurement according to the present invention. In FIG. 1, a conductor 10 is shown. The conductor 10 carries the current flow whose magnitude is to be measured. Enclosing the conductor 10 are a first pair 12 of saturable toroidal reactor cores, consisting of a first core 14 and a second core 16. A second pair of cores 18 consists of a third core 20 and a fourth core 22, which similarly enclose the conductor 10. Also enclosing the conductor 10 is a fifth core 24.

Each of the cores has one or more windings thereon. Specifically, the first core 14 has a feed back winding 26, a bias winding 28 and a control winding 30 wound thereon. The second core has a feed back winding 32 serially connected to the first core feed back winding 26 by a lead 34. The second core 16 also has a bias winding 36 serially connected to the first core bias winding 28 by a lead 38. The second core 16 has a control winding 40 which is connected in opposition to the first core control winding 30 by a lead 42. The third and fourth cores 20, 22 similarly have feed back windings 44, 46, bias windings 48, 50, and control windings 52, 54, respectively, similarly connected by leads 56, 58 and 60 respectively. The fifth core 42 has only a feed back winding 62. The second core feed back winding 32 is serially connected to the third core feed back winding 62 by a lead 64 and the third core feed back winding 44 is similarly connected by a lead 66.

A precision resistor 68 and meter 70 are connected in parallel between ground and the first core feed back winding 26 by a lead 72. Thus, it will be seen, that a series circuit exists through the feed back windings, terminating in the precision resistor 68 and meter 70 which are utilized to present a visual indication of the current flow in the conductor 10, as will be explained further hereinafter. Individual feed back windings are shown in FIG. 1 for each of the cores 14, 16, 20, 22, 24 for purposes of clarity. However, in actual practice, a single feed back winding which is wound over all the cores simultaneously is preferred. Similarly, while individual bias windings 28, 36, 48, 50 are shown for clarity, in practice it is preferred to have a single bias winding wound on the core pair 12 and a single separate bias winding wound on the core pair 18.

The first pair bias windings 28, 36 are connected in magnetic opposition to the second pair bias windings 48, 50 by a pair of leads 74, 76 and a DC potential source indicated as a battery 78. The battery 78 is utilized to apply the DC bias to the bias windings 28, 36, 48, 50 as will be explained further hereinafter.

The first pair control windings 30, 40 are connected in an electrical circuit which, in addition to the lead 42, includes an AC control voltage source 80 and a diode bridge rectifier 82. The second pair control windings 52, 54 and lead 60 are similarly connected in a circuit which includes an AC control voltage source 80' and a diode bridge rectifier 82'. The output of the diode bridge rectifier 82 is developed across a load resistor 84 and the output of the diode bridge rectifier 82' is developed across a load resistor 84'. A differential amplifier 86 is connected to the outputs of the bridge rectifier 82, 82' by leads 88, 90 respectively. An isolating resistor 92 is connected between ground and the outputs of the bridges 82, 82' and the leads 88, 90. The output of the differential amplifier 86 is applied to the serially connected feed back windings 46, 44, 62, 32, 26 through a lead 94.

The operation of the device will now be explained. The DC current flow through the bias windings 28, 36, 48, 50 by reason of the battery 78 is such that the bias applied to the first core pair 12 is opposite in magnetic excitation to the bias applied to the second core pair 18. When current flows through the conductor 10, in each of the core pairs 12, one of the cores will be saturated and the other will be unsaturated by utilizing the two core pairs 12, 18 and current flow through the bias windings 28, 36, 48, 50 the bias current increases the magnetic effect in one of the pairs 18 and decreases the magnetic effect in the other of the pairs 18, of current flow through the conductor 10. Each of the core pairs 12, 18 produces an output signal, by means of the control windings 30, 40, 52, 54 and associated circuitry, in the leads 88 and 90. However, by reason of the current flow through the bias windings, the output signal in the lead 88 will differ from the output signal in the lead 90. The polarity of the difference in output signals will be determined by the direction of current flow in the conductor 10. This difference in output signals is applied to the differential amplifier 86, causing current to flow through the output leads 94 and the feed back windings 46, 44, 62, 32, 26. The direction of current flow through the feed back windings is such as to oppose the magnetic effect of current flow through the conductor 10. The magnitude of current flow through the feed back windings is measured by the meter 70. Current flow magnitude through the feed back windings will continue to increase until such time as the magnetic effect of current flow through the conductor 10 is counterbalanced by the magnetic effect of current flow through the feed back windings. At such time, the output signals in the leads 88 and 90 will equal each other, and the current flow magnitude through the feed back windings, as indicated by the meter 70, will provide a direct indication of the magnitude of current flow through the conductor 10.

Upon a change in magnitude of current flow through the conductor 10, the output signals in the leads 88, 90 will no longer be equal, and so a change in current flow through the feed back windings will occur. When the magnetic effect of the current flow through the feed back windings again counterbalances the magnetic effect of current flow through the conductor 10, the meter 70 will provide an indication of the new current flow through the conductor 10.

The fifth core 24 does not become magnetically saturated during operation of the device. The fifth core therefore serves to closely couple current flow through the conductor with current flow through the feed back windings. Such close coupling provides for excellent high frequency transient response characteristics for the device of the present invention.

One of the disadvantages described above with respect to conventional DC current measurement devices of this type is that of nonlinearity with high current flow rates. As will be seen from the foregoing description, the device of the present invention, except in the unusual instance of an extremely large instantaneous change in current flow through the conductor 10, also operates in that portion of the magnetic induction characteristics of the apparatus which is extremely linear. Therefore, even for extremly high or extremely low current flow through the conductor, the linearity of the measurement, and therefore its accuracy is preserved.

Figure 2:
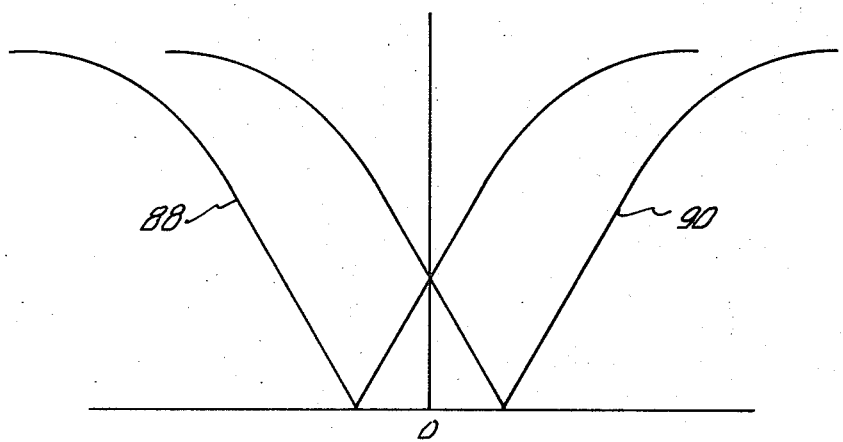
FIG. 2 illustrates the variations in output signals of the two major components of the circuitry of the present invention in the absence of the application of feed back to the circuitry.

Referring now to FIG. 2, there is shown the variation, with current flow through the conductor 10, of the output signals which would be supplied to the leads 88, 90 in the absence of feed back current. As will be seen in FIG. 2, for such an embodiment, a zero current flow through the conductor 10, each of the diode bridge rectifiers 82, 82' produces a DC potential across the load resistors 84, 84' which is supplied to the leads 88, 90. The variations of these potentials, with respect to magnitude and direction of current flow through the conductor 10, are shown in FIG. 2. It will be noted that each of these potentials reaches zero at a different point and that, with respect to the first pair 12, the zero point is to the left or negative side of zero current flow, whereas, with respect to pair 18, the zero point is to the right.

The displacements of these two zero points from the point of zero current flow in the conductor is produced by the flow of current through the bias windings 28, 36, 48, 50. Thus, if bias current flow were terminated, the two curves shown in FIG. 2 would be coincident and would have their zero point at the point of zero conductor current flow.

Also illustrated in FIG. 2 is the nonlinearity of the output signals with respect to increased current flow through the buss. However, in the circuitry utilized in FIG. 1, by reason of the inclusion of the feed back winding and current flow, this nonlinearity is substantially eliminated for the higher values of conductor current flow. In other words, rather than asymptotically approaching the value of the AC voltage sources 80, 80', the circuitry of FIG. 1 operates in the linear portion adjacent the zero points, since the output signals never approach the magnitude of the AC control voltage by reason of the feed back to the circuitry. Indeed, since the feed back ampere turns equal those in conductor 10 the operating point falls along the ordinate. Therefore, the preferred embodiment of the invention includes the utilization of feed back.

Referring now to FIG. 3, there is shown in schematic diagram form, an embodiment of the present invention for utilization with a three-phase power source. The embodiment of FIG. 3 functions generally in the same manner as the embodiment of FIG. 1. Thus, in FIG. 3, a first trio of cores 100 consists of a first core 102, a second core 104 and a third core 106. The first trio of cores 100 correspond generally to the first pair of cores 12 of FIG. 1. A second trio of cores 108 includes a fourth core 110, a fifth core 112 and a sixth core 114. The second trio of cores 108 correspond generally to the second pair of cores 18 of FIG. 1. A seventh core 116 corresponds to the firth core 24 of FIG. 1. As was mentioned with respect to FIG. 1, the individual feed back and bias winding for the cores were shown as individual windings for purposes of clarity but, in practice, were combined. Therefore, in FIG. 3, the single combined feed back winding is shown as a feed back winding 118. The first trio of cores 100 has a bias winding 120 and the second trio of cores 108 has a bias winding 122. The first core 102 has a control winding 124, the second core 104 has a control winding 126, and the third core 106 has a control winding 128, corresponding to the control windings for the cores 14, 16 of FIG. 1. Similarly, cores 110, 112, 114 have control windings 130, 132, 134 respectively. The control windings 124, 126, 128 are connected in a three-phase full wave bridge rectifier circuit 136 and is energized by a three-phase transformer secondary 138. The control windings 130, 132, 134 are similarly connected in a three-phase full wave bridge rectifier circuit 140 which is energized by a three-phase transformer secondary 142. The rectifier circuits 136, 140 are connected by a common lead 142 which supplies one input to the differential amplifier 86 through a lead 144. Load resistors 84, 84' are connected also across rectifier circuits 136, 140. The other input to the differential amplifier 86 is developed across a comparator potentiometer 146, having an arm 148 which is connected to a lead 140 to supply the second input to the differential amplifier 86. The arm 148 of the comparator potentiometer 146 is adjusted to provide a zero current flow indication in the meter 70 for zero current flow through the conductor 10 and, as such, serves as a balancing resistor for the bridge circuits 136, 140. The operation of the circuit of FIG. 3 is the same as the operation of the circuit of FIG. 1, varying only in having a three-phase power supply and, so, three control windings in each bridge circuit rather than the two windings of FIG. 1. While single-phase and three-phase embodiments have been described, utilizing five and seven cores respectively, additional cores may be utilized in various embodiments of the present invention, as will be apparent to those of ordinary skill in the art.

The specific circuitry has been described which comprises the present invention. As will be apparent, in a practical embodiment, it is preferrable to enclose the components in a magnetically permeable shell, such as soft iron, to reduce interference in the operation of the device from externally produced magnetic fields.

The invention claimed is:

1. In a device of the type utilizing a plurality of saturable reactors to measure DC current flow in a conductor, the combination of:
   a first plurality of said reactors for enclosing the conductor;
   a second plurality of said reactors for enclosing the conductor;
   a control winding on each of said reactors;
   a bias winding on each of said reactors;
   a feed back winding on each of said reactors;
   means serially connecting said feed back windings and a current flow indicator means;
   bias circuit means serially interconnecting the bias windings so that the first plurality of bias windings are connected to the second plurality of bias windings in magnetic opposition and including a source of DC potential to energize the bias windings;
   first output circuit means for generating a rectified first output signal and including a source of AC potential, a rectifier circuit, means serially interconnecting the source of AC potential, the rectifier circuit and the control windings on the first plurality of reactors;
   a second output circuit means for generating rectified second output signal and including a source of AC potential, a rectifier circuit, means serially interconnecting the source of AC potential, the rectifier circuit and the control windings on the second plurality of reactors; and
   feed back means including an amplifier having an input and an output, means for applying difference between the first and second output signals to the amplifier as its input, and means connecting the amplifier output in seris with the feed back windings, so that a change in current flow in the conductor produces a difference in magnitude between the first and second output signals applied to the amplifier as its input to change the current flowing in the feed back windings to a magnitude which produces equal first and second output signal magnitudes, whereby the magnitude of the feed back winding current flow is a function of the magnitude of the current flowing in the conductor.

2. The combination of claim 1 and including an additional reactor having a feed back winding thereon.

3. The combination of claim 1 and in which the feed back windings on each of said reactors are formed as a single winding would on all of said reactors.

4. The combination of claim 1 and in which the bias windings on each of said first plurality of reactors are formed as a single winding wound on all of said first plurality of reactors and the bias windings on each of said second plurality of reactors are formed in a single winding wound on all of said second plurality of reactors.

5. The combination of claim 2 and in which the feed back windings on each of said reactors are formed as a single winding wound on all of said reactors.

6. The combination of claim 2, and in which the bias windings on each of said first plurality of reactors are formed as a single winding wound on all of said first plurality of reactors and the bias windings on each of said second plurality of reactors are formed in a single winding wound on all of said second plurality of reactors.

7. The combination of claim 3 and in which the bias windings on each of said first plurality of reactors are formed as a single winding wound on all of said first plurality of reactors and the bias windings on each of said second plurality of reactors are formed in a single winding wound on all of said second plurality of reactors.

8. The combination of claim 5 and in which the bias windings on each of said first plurality of reactors are formed as a single winding wound on all of said first plurality of reactors and the bias windings on each of said second plurality of reactors are formed in a single winding wound on all of said second plurality of reactors.

* * * * *

UNITED STATES PATENT OFFICE
CERTIFICATE OF CORRECTION

Patent No. 3,801,907  Dated April 2, 1974

Inventor(s) MANFRED LILIENSTEIN

It is certified that error appears in the above-identified patent and that said Letters Patent are hereby corrected as shown below:

Column 1, line 12, "one" should be --One-- to read "One such device . . ."; column 1, line 19, "saturaged" should read --saturated--; column 1, line 36, "scond" should read --second--. Column 6, line 17, "seris" should read --series--; column 6, line 31, "would" should read --wound--.

Signed and sealed this 10th day of September 1974.

(SEAL)
Attest:

McCOY M. GIBSON, JR.  C. MARSHALL DANN
Attesting Officer  Commissioner of Patents